April 4, 1961
C. TYJEWSKI
2,977,834
SHEARING APPARATUS FOR CHICKEN WIRE OR THE LIKE INCLUDING
A TOOTHED, PIVOTED WIRE GUIDE
Filed Oct. 16, 1956
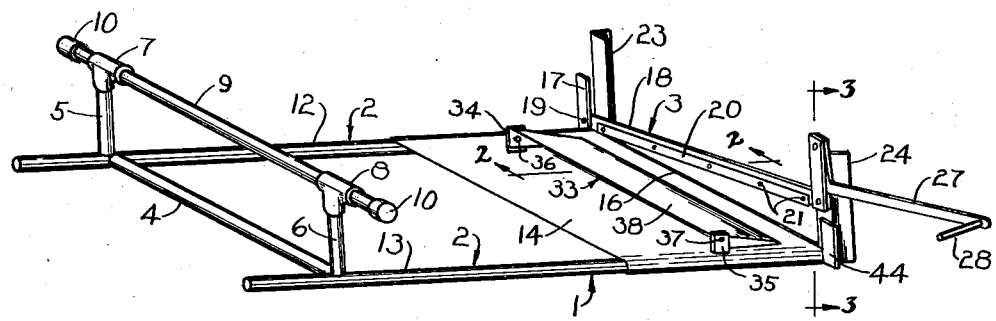
Fig. 1.
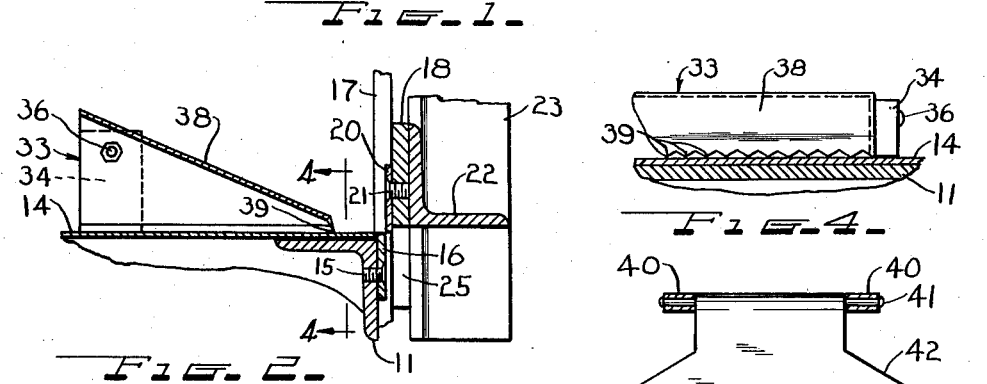
Fig. 2.
Fig. 4.
Fig. 6.
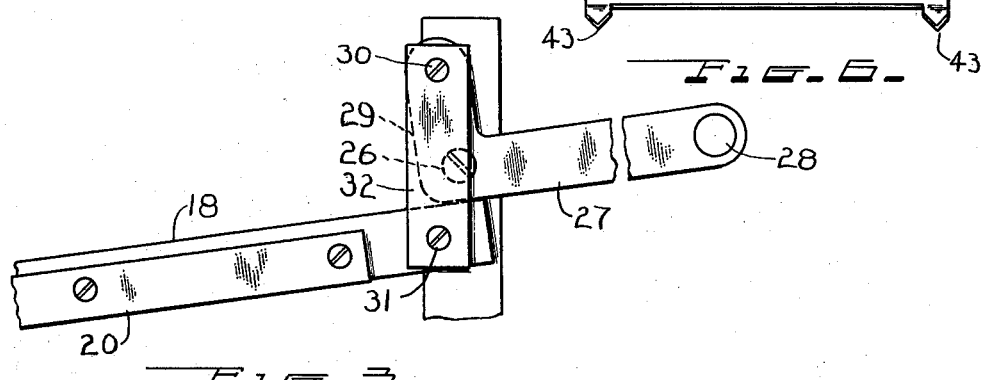
Fig. 3.
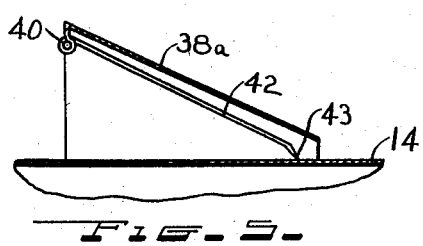
Fig. 5.
INVENTOR
Cezar Tyjewski.
BY Roy A. Plant
ATTORNEY United States Patent Office 2,977,834
Patented Apr. 4, 1961

2,977,834
SHEARING APPARATUS FOR CHICKEN WIRE OR THE LIKE INCLUDING A TOOTHED, PIVOTED WIRE GUIDE

Cezar Tyjewski, 702 Emmett St., Battle Creek, Mich.

Filed Oct. 16, 1956, Ser. No. 616,344

1 Claim. (Cl. 83—447)

The present invention relates broadly to cutting equipment, and in its more specific phases to an apparatus for handling and cutting chicken wire.

Cutting machines or shears of various types have been devised for the cutting of flat sheet stock such as paper and sheet metal. However, the cutting of open mesh material such as chicken wire has been universally handled both by hardwares retailing chicken wire, and the users of chicken wire, such as florists, by means of tin snips. The cutting of chicken wire with tin snips does not permit accurate straight line cutting, and the cut sharp ends of the wires are continually digging and scratching the person cutting the wire. It was the complete lack of any suitable apparatus on the market for both holding and cutting chicken wire, and particularly small pieces of chicken wire used by florists for crumpling and putting in vases to support cut flowers, which led to the conception and development of the present invention.

Accordingly among the objects of the present invention is the provision of a highly simplified, efficient apparatus for holding and cutting chicken wire and the like, and wherein such apparatus is relatively cheap to manufacture.

Another object is to provide an apparatus for cutting chicken wire or the like and wherein such apparatus utilizes a toggle action operated knife, and which apparatus is positive in action, safe, and especially adapted for cutting open mesh sheet material such as chicken wire while holding same against backward movement at the end of the cutting action.

Another object of the invention is to provide a chicken wire cutting apparatus which has a portion for guiding the wire direct to the cutting blades and which has means for holding the chicken wire from moving back out of the guiding portion of the assembly at the end of the cutting step.

A further object is to provide an apparatus for cutting chicken wire having a guiding means ahead of the cutting blades, and wherein such guiding means has incorporated therewith a releasable wire hold back portion and which hold back portion is easily released when the uncut wire portion, or supply roll, is to be removed from the machine.

Still further objects and advantages of this invention will appear as the description proceeds.

To the accomplishment of the foregoing and related ends, the invention, then, consists of the means hereinafter fully described and particularly pointed out in the claim, the annexed drawing and the following description setting forth in detail certain means for carrying out the invention, such disclosed means illustrating, however, but several of the various ways in which the principle of the invention may be used.

In the annexed drawing:

Figure 1 is a perspective view of an assembly embodying the present invention.

Figure 2 is a section view taken on line 2—2 of Figure 1, looking in the direction of the arrows.

Figure 3 is an enlarged fragmentary view taken at line 3—3 of Figure 1, looking in the direction of the arrows.

Figure 4 is an enlarged fragmentary section view taken at line 4—4 of Figure 2, looking in the direction of the arrows.

Figure 5 shows a section view of a modified form of the assembly illustrated in Figure 2.

Figure 6 shows a partially sectioned front view of the hold back member, or dog, in the assembly illustrated in Figure 5.

Referring more particularly to the drawings, the woven wire handling and cutting apparatus 1 has a frame 2 with a cutting assembly 3 at one end, and a cross bar 4 at the other. Mounted on the frame 2 at opposite ends of cross bar 4 are a pair of upright members 5 and 6 which carry on their upper ends T-members 7 and 8 in axial alinement and adapted to have pass therethrough an axle member 9 with a cap 10 on each end of same. At least one of these caps should be readily removable so that axle member 9 can be withdrawn and then passed through the hollow center of a roll of chicken wire or the like (not shown) to be cut up by the present cutting apparatus. After axle member 9 has been replaced with the roll of chicken wire on same, the removed cap 10 can be replaced on the end of the axle member 9 so that same will not work out of T-members 7 and 8 under conditions of use.

At the cutting assembly end of the apparatus, as shown in Figures 1 and 2, an angle iron member 11 is anchored at its ends on the ends of the side members 12 and 13, constituting part of the frame 2, with such angle iron preferably being welded to same. A substantially flat platform or panel member 14 is placed on the top of side members 12 and 13 at least at the cutting assembly end of the frame and anchored in place in conventional manner such as by spot welding, brazing, or the like.

Mounted on the end of angle iron member 11 by means of screws 15 is a stationary cutting blade 16. By mounting the cutting blade 16 in fixed position with screws, this makes possible easy repalcement of the blade, as well as its removal for sharpening when necessary. Mounted on the end of frame 2 at the far end of angle iron 11, as by welding, is a pivot mounting member 17 on which moving blade carrier 18 is mounted by means of a pivot member 19. On the front edge of moving blade carrier 18 is removably mounted a moving blade 20 by means of screws or the like 21 to facilitate its removal for replacement or sharpening. On the back face of moving blade carrier 18, and extending throughout a major portion of the length of same is an angle iron brace member 22, Figure 2, to rigidly support moving blade 20 during cutting of chicken wire, or the like.

Upright support members 23 and 24 are rigidly mounted on the ends of frame 2 with a spacer 25, Figure 2, at each side edge of the over-all assembly at the cutting blade end of same. This spacer is of a thickness such that the moving blade carrier will be movable and supported by the adjacent side edge of the upright support members 23 and 24. Upright support member 24, also carries a pivot member 26, Figure 3, on which the bell crank shaped operating lever 27, with its handle 28, is pivotally mounted. The sidewise extending portion 29 of operating lever 27 has a pivot 30 on its outer end. Connecting this pivot 30 and a pivot 31 on the outer end of moving blade carrier 18 is a link 32. With the operating lever 27 in the position shown in Figures 1 and 3, rotation of same in a counterclockwise direction about pivot member 26 will pivotally move the moving blade carrier 18 in downward direction so that blades 16 and 20 will pass through a shearing operation. In this connection it should be noted that the operating lever will have more and more leverage to move the cutting blade 20 as the end of the counterclockwise movement of operating lever 27 is reached, and at the same time there will be likewise less sidewise directed force on the assembly. Thus at the start of the cutting operation this particular mounting of the moving cutting blade provides ample leverage for cutting, and as the cutting stroke progresses, operating lever 27 through its bell crank shape and linkage supplies a toggle action to continue the leverage required for easy cutting of the chicken wire or the like being cut off. If desired a guide member 44, Figure 1, may be rigidly mounted on the end of frame 2 and spaced from support member 24 a distance slightly greater than the thickness of moving blade carrier 18 so that the end of the latter will be accurately guided in its up and down movements.

Mounted on the top of the platform or panel member 14 is a material guiding assembly 33, Figures 1 and 2. This assembly utilizes, at each end, support members 34 and 35 carrying pivots 36 and 37 on which a funnel-like guide member 38 is pivotally mounted. This funnel-like guide member 38, in one preferred construction, is provided with a deeply serrated edge portion 39, Figure 4, normally in contact with panel 14 and with said serrated edge tapering toward the cutting blades, as shown in Figure 2, the teeth of such serrated edge being of a sufficient depth to engage the chicken wire and hold it down and at the same time prevent it from backing up at the end of the cutting step, but yet not interfering with ready pulling of the chicken wire through between the opened cutting blades in desired amount to be cut off. The funnel-like guide member in this situation pivots as a whole, and when it is desired to back up the uncut chicken wire portion at the end of a cutting operation and rewind same on the stock roll mounted on axle 9, it is an easy matter to merely pivotally lift this serrated edge end of the funnel-like guide member, and unhook the chicken wire from the teeth of the serrated edge, whereupon the wire is ready for rewinding.

A modified construction of the material guiding assembly is shown in Figures 5 and 6. Here the funnel-like guide member 38a is fastened rigidly at its side edges to the platform or panel member 14, such as by welding in conventional manner without the need of support members 34 and 35 at its rear edge. At the upper part of said funnel-like guide member 38a there are mounted a pair of pivot ears 40 with a pivot pin 41 extending through same. Pivotally mounted on this pivot pin 41 between said pivot ears 40 is a dog member 42 which preferably has a pair of pointed ears 43 at its ends, and which ears rest on platform or panel member 14 and inclined downward and toward the cutting blade end of the apparatus. This construction also readily permits moving chicken wire or the like through between the cutting blades and yet engages the holes in the chicken wire to prevent it from moving backward between times of cutting. However, if it is desired to withdraw the chicken wire backwards to the supply roll, this can be readily accomplished by disengaging the pointed ears 43 from the holes in the wire, and then reaching under the funnel-like guide member 38a and raising the dog member 42 to fully release the wire for removal as required.

From the foregoing it will be seen that novel and advantageous provision has been disclosed for attaining the desired ends. Attention is again invited, however, to the possibility of making variations within the spirit and scope of the invention as shown in the drawing, set forth in this specification, and pointed out in the appended claim. While directional terms such as "raising," "backward," "top," "front," "back," "upright," "sidewise," and "counterclockwise" have been used, it is to be understood that such terms have been used solely to facilitate description of the invention and are not intended to act as a limitation thereon.

Other modes of applying the principle of my invention may be employed instead of those explained, change being made as regards the apparatus and combinations herein disclosed, provided the means stated by the following claim or the equivalent of such stated means be employed.

I therefore particularly point out and distinctly claim as my invention:

A shearing machine for severing predetermined lengths of open mesh strip material such as chicken wire or the like, comprising a horizontal frame, vertically extending support means carried on said frame for rotatably supporting a roll of mesh material to be cut, mechanically operated shearing means on said frame in transverse relation to said frame and parallel to said support means, a platform on said frame between said support means and shearing means and adjacent the latter, and a combined strip guide and strip material holding means overlying said platform spaced from said shearing means, said strip guide and strip material holding means comprising a gravity-responsive funnel-shaped housing above said platform and including planar triangular sides having an apex portion extending toward said shearing means and a planar top extending angularly and vertically from said platform and defining a high inlet opening toward said support means and a low outlet opening toward and adjacent said shearing means, said inlet and outlet extending transversely of said platform and said sides restraining lateral movement of strip material received therein, said strip guide and strip material holding assembly including depending, transversely spaced, toothed portions contacting the upper surface of said platform for engaging said open meshed material and inclining downwardly toward said shearing means, said toothed portions, being vertically displaceable above said platform for permitting mesh material to be moved through said guide means from said support means to said shearing means and preventing reverse movement, said toothed portions forming the outlet edge of said housing, vertical support members on said platform pivotally mounting said housing at said planar triangular sides rearwardly and above said toothed portions and on a horizontal axis of rotation above said platform and adjacent the inlet opening of said housing.

References Cited in the file of this patent

UNITED STATES PATENTS

| 408,551 | Tivy et al. | Aug. 6, 1889 |
| 526,299 | Dana | Sept. 18, 1894 |
| 609,896 | Morris | Aug. 30, 1898 |
| 671,083 | Hull | Apr. 2, 1901 |
| 810,791 | McCourt et al. | Jan. 23, 1906 |
| 1,043,737 | Small | Nov. 5, 1912 |
| 1,332,194 | Arcus | Mar. 2, 1920 |
| 1,543,010 | Johnson | June 23, 1925 |
| 1,717,043 | Kistler | June 11, 1929 |
| 2,023,045 | Flood | Dec. 3, 1935 |
| 2,149,869 | Ringel | Mar. 7, 1939 |
| 2,301,064 | Meitner | Nov. 3, 1942 |
| 2,834,646 | Berg | May 13, 1958 |

FOREIGN PATENTS

| 6,065 | Great Britain | Mar. 11, 1913 |
| 245,480 | Great Britain | Jan. 4, 1926 |